United States Patent
Vollmann et al.

(10) Patent No.: US 12,084,076 B2
(45) Date of Patent: Sep. 10, 2024

(54) METHOD AND NETWORK FOR PRE-CONDITIONING AT LEAST ONE COMPONENT OF A MOTOR VEHICLE

(71) Applicant: AUDI AG, Ingolstadt (DE)

(72) Inventors: Stefan Vollmann, Ingolstadt (DE); Christian Meyer, Landshut (DE)

(73) Assignee: AUDI AG, Ingolstadt (DE)

( * ) Notice: Subject to any disclaimer, the term of this patent is extended or adjusted under 35 U.S.C. 154(b) by 370 days.

(21) Appl. No.: 17/766,152

(22) PCT Filed: Nov. 13, 2020

(86) PCT No.: PCT/EP2020/082010
§ 371 (c)(1),
(2) Date: Apr. 1, 2022

(87) PCT Pub. No.: WO2021/144051
PCT Pub. Date: Jul. 22, 2021

(65) Prior Publication Data
US 2022/0371609 A1    Nov. 24, 2022

(30) Foreign Application Priority Data
Jan. 15, 2020 (DE) .................... 10 2020 100 816.3

(51) Int. Cl.
*B60W 50/00* (2006.01)
*B60W 40/08* (2012.01)
(Continued)

(52) U.S. Cl.
CPC ............ *B60W 50/10* (2013.01); *B60W 40/08* (2013.01); *B60W 40/105* (2013.01); *G07C 5/008* (2013.01);
(Continued)

(58) Field of Classification Search
CPC .... B60W 50/10; B60W 40/08; B60W 40/105; B60W 2554/4041; B60W 2040/0809; G07C 5/008
(Continued)

(56) References Cited

U.S. PATENT DOCUMENTS

2005/0237150 A1  10/2005 Sun et al.
2016/0207374 A1   7/2016 Gauthier et al.
(Continued)

FOREIGN PATENT DOCUMENTS

CN    105916742 A    8/2016
DE    35 01 260 A1   7/1986
(Continued)

OTHER PUBLICATIONS

Nerling et al., "Automobiletechnische Zeitschrift", Jul. 8, 2016, pp. 42-47.
(Continued)

*Primary Examiner* — Tiffany P Young
(74) *Attorney, Agent, or Firm* — STAAS & HALSEY LLP

(57) ABSTRACT

An identification key associated with a motor vehicle is carried by a user as the user moves outside of the motor vehicle. When the identification key enters the reception range of short-range transceiver units, position data of the identification key are ascertained and transmitted via a far-field transceiver unit which is not included in the identification key. The receiver of the transmitted position data ascertains a movement vector for the identification key from the position data. If the movement vector meets at least one predefinable activation criterion, preconditioning of at least one component of the motor vehicle is activated.

20 Claims, 2 Drawing Sheets

(51) Int. Cl.
*B60W 40/105* (2012.01)
*B60W 50/10* (2012.01)
*G07C 5/00* (2006.01)

(52) U.S. Cl.
CPC ............... *B60W 2040/0809* (2013.01); *B60W 2554/4041* (2020.02)

(58) Field of Classification Search
USPC ............................................................ 701/1
See application file for complete search history.

(56) References Cited

U.S. PATENT DOCUMENTS

| | | |
|---|---|---|
| 2016/0207375 A1 | 7/2016 | Gauthier et al. |
| 2018/0201092 A1 | 7/2018 | Ahuja et al. |
| 2019/0061746 A1 | 2/2019 | Abinger et al. |

FOREIGN PATENT DOCUMENTS

| | | |
|---|---|---|
| DE | 37 35 553 A1 | 5/1989 |
| DE | 10 2007 049 683 A1 | 4/2009 |
| DE | 10 2010 052 812 A1 | 6/2011 |
| DE | 10 2011 018 749 A1 | 10/2012 |
| DE | 10 2011 055 704 A1 | 5/2013 |
| DE | 10 2012 008 386 A1 | 10/2013 |
| DE | 10 2013 214 557 A1 | 1/2015 |
| DE | 10 2013 220 208 A1 | 4/2015 |
| DE | 10 2014 112 849 A1 | 3/2016 |
| DE | 10 2014 224 108 A1 | 6/2016 |
| DE | 10 2016 002 460 A1 | 9/2016 |
| DE | 10 2017 206 212 A1 | 10/2018 |
| DE | 10 2020 100 816.3 | 7/2021 |
| EP | 0 224 355 A2 | 6/1987 |
| EP | 3 313 105 A1 | 4/2018 |
| JP | 2006-347295 A | 12/2006 |
| WO | 2011/066907 A1 | 6/2011 |
| WO | PCT/EP2020/082010 | 11/2020 |

OTHER PUBLICATIONS

International Search Report dated Feb. 8, 2021 for International Application No. PCT/EP2020/082010.
Translation by WIPO of International Preliminary Report on Patentability for International Appl. No. PCT/EP2020/082010 dated Jul. 21, 2022.
Office Action dated Oct. 8, 2020 for German Patent Application No. 10 2020 100 816.3.
Office Action dated Aug. 29, 2022 for Chinese Application No. 202080071817.1, with English language summary of Examiner's comments.

METHOD AND NETWORK FOR PRE-CONDITIONING AT LEAST ONE COMPONENT OF A MOTOR VEHICLE

CROSS REFERENCE TO RELATED APPLICATIONS

This application is a U.S. national stage of International Application No. PCT/EP2020/082010, filed on Nov. 13, 2020. The International Application claims the priority benefit of German Application No. 10 2020 100 816.3 filed on Jan. 15, 2020. Both the International Application and the German Application are incorporated by reference herein in their entirety.

BACKGROUND

Described below are a method for preconditioning at least one component of a first motor vehicle, with which a first identification key is associated and a network with a plurality of short-range transceiver units, far-field transceiver units and a central data processing apparatus, which are designed to carry out the method by executing a computer program.

Preconditioning is understood to mean the preset-ting of certain operating parameters of a component prior to actual use.

In this regard, US 2016/0207374 A1 discloses a method for thermally preconditioning a vehicle's passenger cabin prior to the vehicle's departure. A vehicle proximity detection system is provided for ascertaining a distance between the vehicle and the driver. The probability of the vehicle departing from the current location within a specified number of minutes is ascertained, wherein the probability is based on the current time, the current date, the distance between driver and vehicle, the current vehicle location and a database containing historical data. Control via a user's smartphone calendar can also be provided. The vehicle proximity detection system can monitor the location of a smartphone of the driver and ascertain the whereabouts of the driver therefrom. The distance between driver and vehicle can be determined from the whereabouts of the driver and the current vehicle location. A plurality of departure times can be stored in the historical database.

E 10 2013 214 557 A1 discloses a method for preliminary climate control of a stationary motor vehicle. The preliminary climate control is carried out by a control element external to the vehicle by programming times for heating units. Immediate or time-controlled activation can be provided. The control element external to the vehicle can be integrated in a separate radio remote control or in a key unit. The activation and programming can be carried out via a smartphone or tablet by an app. Alternatively, the activation for the preliminary climate control can take place, by transmission of the GPS position of the control element external to the vehicle or a change in this GPS position, by the control unit in the vehicle comparing this position with the vehicle position and activating the preliminary climate control within a predetermined distance from or proximity to the vehicle. In one configuration, a particular area where this function is not activated, for example a garage at home or at work, can be designated. However, the preliminary climate control can be activated if a movement toward the vehicle is detected. Activation of the heating surfaces for preliminary climate control of the vehicle can take place when the vehicle is stationary through the detection of Bluetooth signals transmitted by the control element external to the vehicle.

JP 2006 347 295 A discloses a method for preliminary temperature control of an electric vehicle. The start time is ascertained based on the position of the vehicle and of the user, for example by way of a mobile telephone, wherein the relative distance, direction and speed of approach are used.

Other preconditioning methods are known from US 2018/0201092 and DE 10 2014 224 108.

A disadvantage of these methods is the fact that the constant tracking of the position of the identification key, i.e. for example of a smartphone, of a user subjects the storage battery of the identification key to a significant degree of usage, with the result that the standby times of a smartphone used for these purposes are reduced undesirably fast. Smartphones used in the related art therefore have to be charged undesirably frequently. They run the risk of no longer being available for making telephone calls, which is their real purpose.

SUMMARY provide an option for preconditioning at least one component of a motor vehicle that subjects the resources of an identification key carried by a user for this purpose to a lesser degree of usage.

The method is based on the insight that the idle time of an identification key carried by a user, which is associated with the motor vehicle of the user, for example a smartphone, can be extended if it is not a far-field transceiver unit of the identification key that is used to ascertain a respective current position of the identification key, but rather a short-range transceiver unit. Here, "short-range communication" is intended to mean a wireless transmission of signals over short distances; see, in this regard, https://www.rohm.com/electroniccs/basics/wireless/short-range-wireless-communication or https://de.wikipedia.org/wiki/short-range_wireless_networks. Far-field communication provides communication in accordance with a mobile radio standard. Far-field transceiver units therefore transmit in particular in accordance with mobile radio methods, for example GSM, LTE and the like, while short-range transceiver units operate for example via Bluetooth, WLAN and the like with a much lower transmission power, wherein, as well as the active transmitters mentioned, there are even passive apparatuses, for example transponders, which are perfectly adequate for the purpose of the method. The entity providing far-field radio can thus be arranged in an object that has significantly better access to the energy supply required for the far-field transceiver unit. For example, motor vehicles, which have a significantly greater requirement for electrical energy than a mobile identification key, or infrastructure elements connected to a power supply network, can be used as objects of this kind. Other identification keys can also be employed, for example depending on the state of charge thereof.

This makes it possible to achieve reliable pre-conditioning of at least one component of the motor vehicle of the user without the idle time of their identification key, for example their smartphone, being significantly affected. Accordingly, the storage battery of the identification key needs to be charged less frequently, which is more convenient for the user and increases the operational capability of their identification key.

Accordingly, a plurality of short-range transceiver units are initially provided. When the first identification key, which is associated with a first motor vehicle and is being carried by a user while the user moves outside of the first motor vehicle, enters the reception range of a first one of the short-range transceiver units, first position data of the first identification key are ascertained by the first short-range transceiver unit. The respective position data can be ascertained autonomously by the respective short-range transceiver unit, but they can also be ascertained by an appropriate apparatus of the first identification key and transmitted to the respective short-range transceiver unit, which thus ascertains the position data with the support of the first identification key. These first position data are transmitted via a far-field transceiver unit, which is not arranged in the first identification key. As soon as the first identification key enters the reception range of at least one further one of the short-range transceiver units, further position data of the first identification key are ascertained by the further short-range transceiver unit by the further short-range transceiver unit. The ascertained second position data are transmitted via a far-field transceiver unit, which is not arranged in the first identification key. Then, the transmitted at least first and second position data are received by a far-field transceiver unit and at least one movement vector for the first identification key is ascertained from the at least first and second received position data. The ascertained movement vector is checked to see if it meets at least one predefinable activation criterion for activating the preconditioning of the at least one component of a motor vehicle. If so, the preconditioning of the at least one component of the motor vehicle is activated.

The respective short-range transceiver units may be arranged in a manner permanently installed in respective motor vehicles, in respective second identification keys or in respective infrastructure elements. Road signs, traffic lights, road marker posts and the like are possible infrastructure elements. It is thus very likely that the user will pass at least two short-range transceiver units on the way to their motor vehicle, with the result that the ascertainment of a movement vector as a prerequisite for activation of the preconditioning of the at least one component of the user's motor vehicle is fulfilled. In particular in pedestrian areas, in which there are few road signs and the like, the second identification keys can be employed.

The respective position data may be transmitted using far-field transceiver units arranged in the respective motor vehicles and/or in the respective identification keys and/or in the respective infrastructure elements. In this regard, provision can be made for the state of charge of the energy stores of respective second identification keys to initially be checked when the second identification keys are used for transmission, and for the respective far-field transceiver unit to be put to use only if the state of charge is above a predefinable threshold, for example is more than 50%.

Alternatively, provision can be made for the respective position data to be initially transmitted serially by short-range transceiver units, in particular by short-range transceiver units arranged in the respective motor vehicles and/or respective second identification keys and/or in the respective infrastructure elements, and, if a network element that has a short-range transceiver unit and a far-field transceiver unit is detected, by this far-field transceiver unit. Second identification keys can thus be used even if the state of charge of the energy stores thereof is below the predefinable threshold value, since forwarding by a short-range transceiver unit has only a negligible impact on the respective energy store. A further advantage of this variant is that the method can be implemented even though the involved motor vehicles, second identification keys and infrastructure elements are not all equipped with far-field transceiver units. In particular, for example for reasons of cost, infrastructure elements have to be equipped only with short-range transceiver units, such that they do not have their own far-field transceiver units. Taking into account the coverage of short-range transceiver units, they can be used highly reliably to ascertain position data and to use these to ascertain a movement vector.

The at least first and second position data may be transmitted to a far-field transceiver unit of a central data processing apparatus, in particular a backend server. Suitable remote memories and computational resources can be provided there, such that mobile units are not burdened by this. In addition, movement patterns can be ascertained in the central data processing apparatus, the movement patterns being an indication of the fact that there is a predefinable probability that the user will start their motor vehicle within a predefinable period of time, such that, if a movement pattern of this kind occurs, the pre-conditioning of the at least one component of the motor vehicle should be activated. Such activation patterns can accordingly not only be ascertained in the central data processing apparatus but also stored there in order to be available for a comparison. The position data are particularly advantageously transmitted in an anonymized manner. For this purpose, for example, a code can be generated on a daily basis by a random number generator in the first identification key, the code then making it possible to associate ascertained position data with a particular first identification key. Because the code changes daily, the method can accordingly be implemented without the transmission of personal data.

The short-range transceiver units and the far-field transceiver units form, together with the central data processing apparatus, in particular with a far-field transceiver unit arranged therein, form a communication network. In this regard, provision can be made for the communication network to be operated in a brand-specific or user-specific manner. This can thus involve software which is installed in a motor vehicle, controls the functionality and access to the network and has to be activated, for example, via a human-machine interface.

Accordingly, the central data processing apparatus, if warranted, transmits an activation signal for activating the preconditioning of at least one component of the first motor vehicle to a control apparatus of the first motor vehicle.

The central data processing apparatus may transmit, by way of a far-field transceiver unit, the position data of the first identification key and/or the movement vector to a far-field transceiver unit which is associated with the first motor vehicle, wherein the far-field transceiver unit transmits the received data to a control apparatus of the first motor vehicle to perform the rest of the method. In other words, the ascertainment of the movement vector can be performed either in the central data processing apparatus or in a control apparatus of the first motor vehicle. If this takes place in the variant using the control apparatus of the motor vehicle, then configuration in terms of when activation is to be carried out, which components are to be activated, and the like, is possible in a particularly simple manner for the user of the first motor vehicle.

The first identification key and/or the further identification keys may each be a vehicle key, a chip card or a mobile terminal, for example a smartphone. In the case of objects of this kind, there is a very high probability that they are carried by a user anyway, such that the effort involved in carrying out the method can be kept at a particularly low level.

It has proven particularly advantageous to activate the preconditioning of at least one of the following components: an air-conditioning apparatus, a unit bearing, in particular for mounting drive and auxiliary units, a chassis bearing, in particular in the wheel-motor vehicle body transmission chain, a vehicle battery, a catalytic converter, a vehicle tank, a power electronics component. In this regard, it should be noted that preconditioning relates not only to temperature control of a passenger compartment or a battery, but also to components that affect other properties such as driving comfort. Thus, unit bearings of a vehicle can be preheated, which has a positive effect on the damping properties or the viscosity of fluids and thus provides for comfortable suspension right from the first kilometer. Heated bearing variants are known, for example, from DE 35 01 260, DE 10 2012 008 386, DE 37 35 553, EP 224 355 and DE 10 2007 049 683.

What is checked as a pre-definable activation criterion may be an undershoot of a pre-definable distance radius from the first motor vehicle, wherein a direction of the movement vector (direction and speed) over a predefinable period of time additionally meets a predefinable direction criterion, or a sequence of movement patterns, in particular of movement patterns that may be learned and stored in the central data processing apparatus or the control apparatus of the first motor vehicle.

Furthermore, a parameter of the pre-conditioning, in particular the power supplied to the at least one component of the motor vehicle, may be varied depending on the sequence of movement patterns. It can thus be ensured that a desired preconditioning, for example the setting of a predefinable temperature of the respective components, is achieved both in a timely manner before the user arrives at their car and also without unnecessary energy consumption. According to a development, the short-range transceiver units and/or the far-field transceiver units of the motor vehicle are designed to transmit data to the central data processing apparatus for predicting a speed of movement for the first identification key until the arrival of the first identification key at the first motor vehicle, wherein the central data processing apparatus, or the control apparatus of the first motor vehicle establishes an activation time of the at least one component of the motor vehicle depending on the predicted speed of movement. In other words, swarm data of other first identification keys can be used to ascertain a walking time up to the motor vehicle in order to take into account high footfall on a path or long waiting times at the pay station of a car park. The swarm data may be anonymized quantitative data, which are used for the static calculation of a static probability.

Described herein is a network with a plurality of short-range transceiver units, far-field transceiver units and a central data processing apparatus, which are designed to carry out the method described herein by executing a computer program which can be loaded directly into a memory of a control device of a short-range transceiver unit, a far-field transceiver unit or a central data processing apparatus.

The embodiments presented in connection with the method and the advantages thereof apply correspondingly to the network.

The control apparatus for the motor vehicle has a processor device set up to carry out the method. For this purpose, the processor device can have at least one microprocessor and/or at least one microcontroller and/or at least one FPGA (field-programmable gate array) and/or at least one DSP (digital signal processor). Furthermore, the processor device can include program code which, when executed by the processor device, performs the method. The program code can be stored in a data memory of the processor device.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
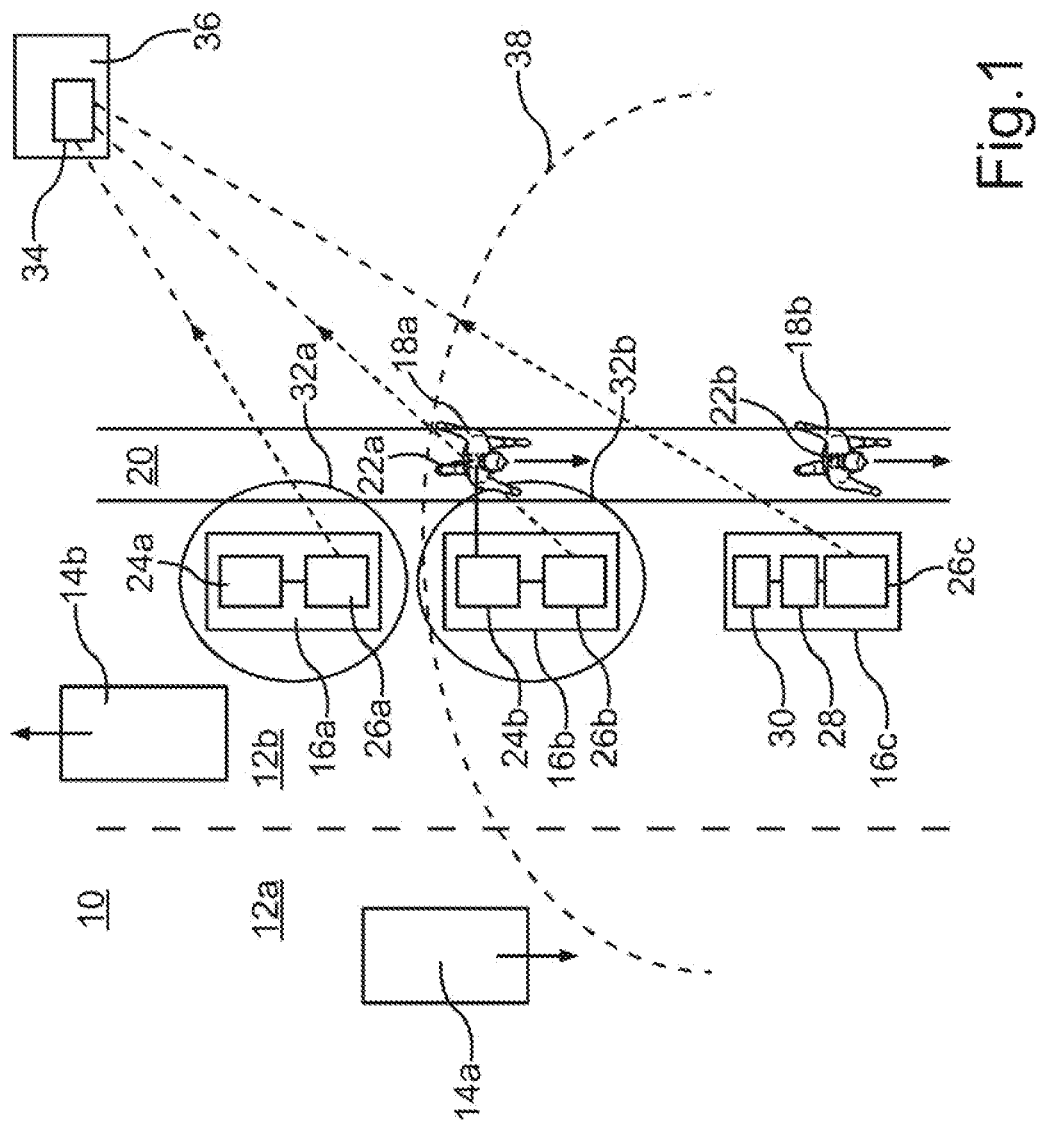
FIG. 1 is a schematic block diagram of an exemplary embodiment.

Reference will now be made in detail to the preferred embodiments, examples of which are illustrated in the accompanying drawings, wherein like reference numerals refer to like elements throughout.

In the exemplary embodiments, the described components of the embodiments each represent individual features that should be considered independently of one another and that each also develop the invention independently of one another. The disclosure is therefore also intended to include combinations of the features of the embodiments other than those illustrated. In addition, the described embodiments can also be complemented by further features that have already been described.

In the figures, identical reference signs each denote functionally identical elements.

FIG. 1 shows a road 10 with two lanes 12a, 12b, on which respective motor vehicles 14a, 14b are traveling in accordance with the direction arrows shown. Vehicles 16a, 16b, 16c are parked on the right-hand side of the lane 12b. The vehicle 16c is the vehicle of a user 18a, and therefore, in the context of this exemplary embodiment, an ego-vehicle. Accordingly, the vehicles 16a and 16b are other vehicles. The user 18a walks along a sidewalk 20 in accordance with the associated direction arrow and, in doing so, goes past the motor vehicles 16a, 16b. The user 18 carries an identification key 22a, for example a vehicle key, a chip card or a mobile terminal, for example a smartphone.

Short-range transceiver units 24a, 24b and far-field transceiver units 26a, 26b are arranged in the motor vehicles 16a, 16b. The respective units are in each case coupled to one another within a vehicle.

At least one far-field receiver unit 26c, a control apparatus 28 and a component 30 to be preconditioned are arranged in the motor vehicle 16c.

Figure 2:
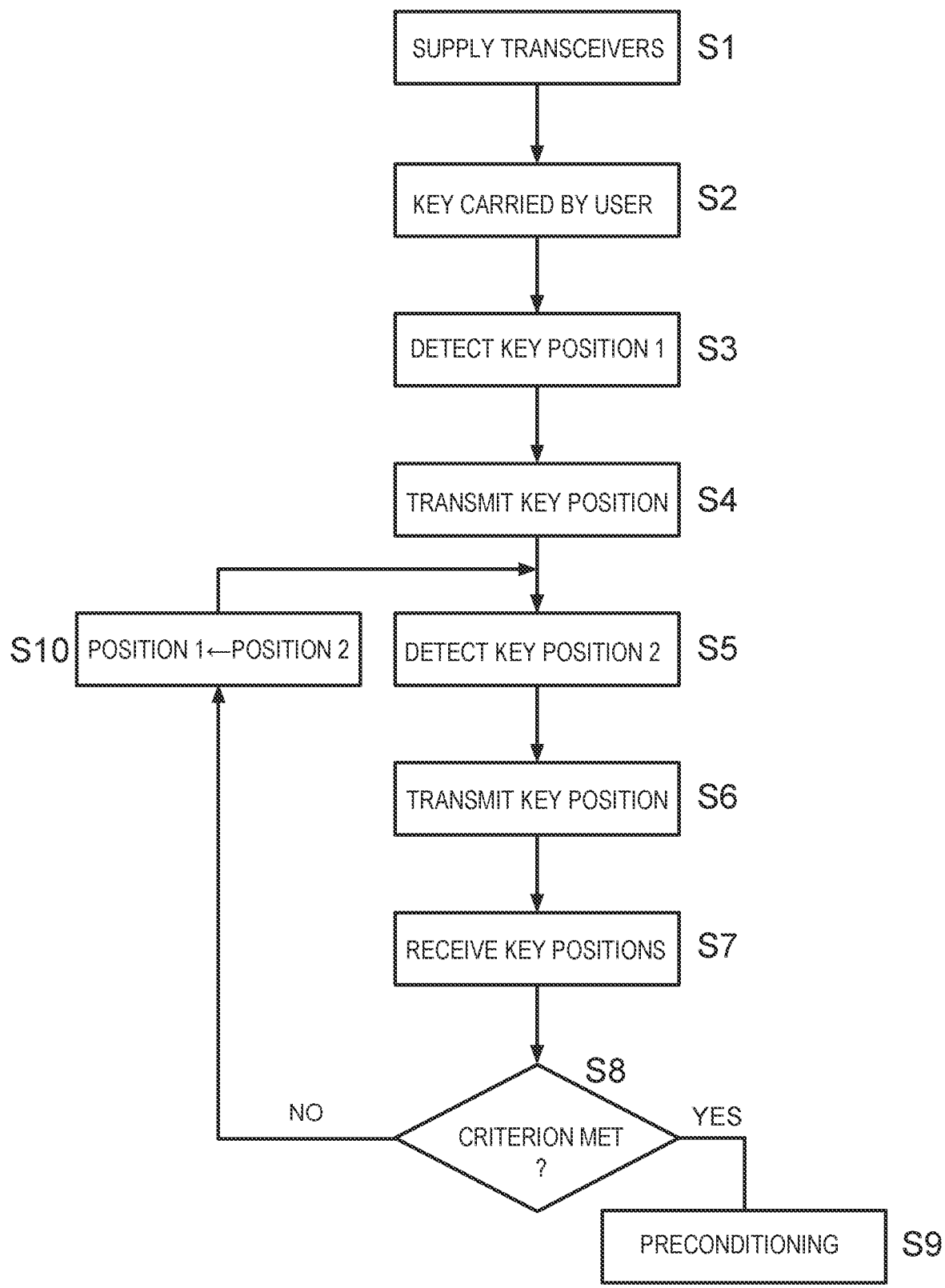
FIG. 2 is a flow chart of an exemplary embodiment of the method.

One exemplary embodiment of the method is described below with reference to FIG. 2:

In S1, accordingly, a plurality of short-range transceiver units 24a, 24b are provided. In S2, the identification key 22a is carried by the user 18a as the user 18a moves outside of their motor vehicle 16c. As soon as the user's identification key 22a enters the reception range 32a of the short-range transceiver unit 24a, first position data of the identification key 22a are ascertained by the short-range transceiver unit 24a (S3). These ascertained first position data are transmitted, via the far-field transceiver unit 26a arranged in the vehicle 16a, to a far-field transceiver unit 34 of a central data processing apparatus 36 (S4). As the user 18a walks along the sidewalk 20, their identification key 22a then enters the reception range 32b of the short-range transceiver unit 24b of the motor vehicle 16b, which then ascertains second position data of the identification key 22a by the further short-range transceiver unit 24b (S5). These ascertained second position data are also transmitted, via the far-field transceiver unit 26b of the motor vehicle 16b, to the far-field transceiver unit 34 of the central data processing apparatus 36 (S6). In S7, the transmitted first and second position data are received by the far-field transceiver unit 34 of the central data processing apparatus 36, and a movement vector for the identification key 18a is ascertained from the received position data. While the first and second position data likely are received by the far-field transceiver unit 34 of the central data processing apparatus 36 at different times, the reception is simplified here for the purpose of explanation.

In S8, it is checked whether the ascertained movement vector meets a predefinable activation criterion for activating the preconditioning of the component 30 of the motor vehicle 16c. In this regard, it can be checked whether the user 18a undershoots a predefinable distance radius 38 from their motor vehicle 16c. This ascertainment may occur in the central data processing apparatus 36. If the result is affirmative, in S9, the preconditioning of the component 30 of the motor vehicle 16c is activated by the far-field transceiver unit 34 of the central data processing apparatus 36 transmitting a corresponding activation signal to the far-field transceiver unit 34 of the motor vehicle 16c, which transmits the received activation signal to the control apparatus 28, which then actuates the component 30. If the result of the check in S9 is negative, the second position data become first position data (S10) and the method returns to S5.

In embodiments that are not illustrated, a plurality of position data can also be evaluated in order to ascertain a movement vector, wherein the method must then be adapted accordingly.

Energy storage apparatuses in the identification key 22a and in the motor vehicles 16a to 16c for supplying the identification key 22a and the motor vehicles 16a to 16c with electrical energy are not illustrated.

As can be seen from FIG. 1, a further user 18b with an identification key 22b is walking along the sidewalk 20 in front of the user 18a. By evaluating the position data of the identification key 18b, a speed of movement of the user 22a can be predicted and taken into account in the generation of the activation signal for activating the component 30 of the motor vehicle 16c by the data processing apparatus 36. For example, if the predicted movement speed is low, the activation of the preconditioning can take place at a later time than in the case of a high predicted movement speed. Furthermore, if the predicted movement speed is high, the activation signal can be formed such that the component 30 is operated at higher power through corresponding actuation by the control apparatus 28 than in the case of a low predicted movement speed.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for preconditioning at least one component of a motor vehicle, with which a first identification key is associated, comprising:
    providing a plurality of short-range transceiver units;
    ascertaining first position data of the first identification key carried by a user while the user moves outside of the motor vehicle as soon as the first identification key enters a reception range of a first one of the short-range transceiver units, the first short-range transceiver unit ascertaining the first position data of the first identification key;
    transmitting the first position data via a first far-field transceiver unit not disposed in the first identification key;
    ascertaining second position data of the first identification key, as soon as the first identification key enters the reception range of at least one further short-range transceiver unit among the short-range transceiver units, the further short-range transceiver unit ascertaining the second position data of the first identification key;
    transmitting the second position data via a second far-field transceiver unit;
    receiving at least the first and second position data by a third far-field transceiver unit;
    ascertaining at least one movement vector for the first identification key from at least the first and second position data;
    checking whether the movement vector meets at least one predefinable activation criterion for activating the preconditioning of the at least one component of the motor vehicle; and
    when the checking is affirmative, activating the preconditioning of the at least one component of the motor vehicle.

2. The method according to claim 1, wherein the short-range transceiver units are permanently installed in at least one of respective motor vehicles, respective second identification keys and respective infrastructure elements.

3. The method according to claim 2,
    wherein the first and second far-field transceiver units are disposed in the at least one of respective motor vehicles, respective second identification keys and respective infrastructure elements, and/or
    wherein the first and second position data are initially transmitted serially by the short-range transceiver units in the at least one of respective motor vehicles, respective second identification keys and respective infrastructure elements, and a network element having both short-range and far-field transceiver units.

4. The method according to claim 3, wherein at least the first and second position data are transmitted to the third far-field transceiver unit of a central data processing apparatus providing a backend server that performs the ascertaining.

5. The method according to claim 4, wherein the short-range transceiver units and the first, second and third far-field transceiver units form a communication network to the central data processing apparatus.

6. The method according to claim 5, further comprising:
    transmitting from the central data processing apparatus, by way of the third far-field transceiver unit, at least one of the position data of the first identification key and the movement vector to a fourth far-field transceiver unit associated with the first motor vehicle;
    transmitting, from the fourth far-field transceiver unit, the at least one of the position data and the movement vector to a control apparatus of the first motor vehicle; and
    wherein the control apparatus performs the checking and activating.

7. The method according to claim 4, wherein the central data processing apparatus performs the checking and activating.

8. The method according to claim 4, further comprising:
transmitting from the central data processing apparatus, by way of the third far-field transceiver unit, at least one of the position data of the first identification key and the movement vector to a fourth far-field transceiver unit associated with the first motor vehicle;
transmitting, from the fourth far-field transceiver unit, the at least one of the position data and the movement vector to a control apparatus of the first motor vehicle; and
wherein the control apparatus performs the checking and activating.

9. The method according to claim 8, wherein at least one of the first identification key and the further identification keys are one of a vehicle key, a chip card and a mobile terminal.

10. The method according to claim 9, the activating the preconditioning is of at least one of:
an air-conditioning apparatus;
a unit bearing mounting drive and auxiliary units;
a chassis bearing in a wheel-motor vehicle body transmission chain;
a vehicle battery;
a catalytic converter;
a vehicle tank; and
a power electronics component.

11. The method according to claim 10, wherein the checking is of a predefinable activation criterion, including at least one of:
within a predefinable distance radius of the first motor vehicle, while a direction of the movement vector, including both direction and speed, over a predefinable period of time meets a predefinable direction criterion, and
a sequence of movement patterns learned and are stored in at least one of the central data processing system and the control apparatus of the first motor vehicle.

12. The method according to claim 11, further comprising varying, as a parameter of the preconditioning, power supplied to the at least one component of the motor vehicle depending on the sequence of movement patterns.

13. The method according to claim 12, further comprising:
transmitting, by at least one of the short-range transceiver units and the first, second, third and fourth far-field transceiver units of the network, relevant data to the central data processing apparatus;
predicting, by the central data processing apparatus from the relevant data, a speed of movement for the first identification key until arrival of the first identification key at the first motor vehicle; and
establishing, by at least one of the central data processing apparatus and the control apparatus of the first motor vehicle, an activation time of the at least one component of the motor vehicle depending on the speed of movement.

14. The method according to claim 4, further comprising:
transmitting, by at least one of the short-range transceiver units and the first, second and third far-field transceiver units, relevant data to the central data processing apparatus;
predicting, by the central data processing apparatus from the relevant data, a speed of movement for the first identification key until arrival of the first identification key at the first motor vehicle; and
establishing, by at least one of the central data processing apparatus and the control apparatus of the first motor vehicle, an activation time of the at least one component of the motor vehicle depending on the speed of movement.

15. The method according to claim 4, wherein the checking is of a predefinable activation criterion, including at least one of:
within a predefinable distance radius of the first motor vehicle, while a direction of the movement vector, including both direction and speed, over a predefinable period of time meets a predefinable direction criterion, and
a sequence of movement patterns learned and are stored in at least one of the central data processing system and the control apparatus of the first motor vehicle.

16. The method according to claim 15, further comprising varying, as a parameter of the preconditioning, power supplied to the at least one component of the motor vehicle depending on the sequence of movement patterns.

17. The method according to claim 1, wherein at least one of the first identification key and the further identification keys are one of a vehicle key, a chip card and a mobile terminal.

18. The method according to claim 1, the activating the preconditioning is of at least one of:
an air-conditioning apparatus;
a unit bearing mounting drive and auxiliary units;
a chassis bearing in a wheel-motor vehicle body transmission chain;
a vehicle battery;
a catalytic converter;
a vehicle tank; and
a power electronics component.

19. A network for preconditioning at least one component of a motor vehicle with which an identification key is associated, comprising:
short-range transceiver units, each configured to ascertain position data of the identification key carried by a user while the user moves outside of the motor vehicle, as soon as the identification key enters a reception range thereof;
far-field transceiver units, each configured to transmit the position data via a far-field transmission of which the identification key is incapable; and
a central data processing apparatus configured to
receive from at least one far-field transceiver unit, at least first and second position data ascertained by at least first and second short-range transceivers,
ascertain at least one movement vector for the identification key from the at least first and second position data,
checking whether the movement vector meets at least one predefinable activation criterion for activating the preconditioning of the at least one component of the motor vehicle, and
transmit, via the at least one far-field transceiver unit, an instruction to the motor vehicle to activate the preconditioning of the at least one component of the motor vehicle, when the checking is affirmative.

20. Non-transitory computer-readable media embodying program code that when executed by control devices of short-range transceiver units, at least one far-field transceiver unit and a central data processing apparatus perform a method for preconditioning at least one component of a motor vehicle with which an identification key is associated, comprising:
ascertaining, by a first short-range transceiver unit, first position data of the identification key carried by a user while the user moves outside of the motor vehicle, as soon as the identification key enters a reception range of the first short-range transceiver unit;

transmitting the first position data via a far-field transmission of which the identification key is incapable;

ascertaining, by a further short-range transceiver unit, second position data of the identification key, as soon as the identification key enters the reception range of the further short-range transceiver unit;

transmitting the second position data via another far-field transmission;

receiving at least the first and second position data by a far-field transceiver unit;

ascertaining at least one movement vector for the identification key from at least the first and second position data;

checking whether the movement vector meets at least one predefinable activation criterion for activating the preconditioning of the at least one component of the motor vehicle; and activating the preconditioning of the at least one component of the motor vehicle when the checking is affirmative.

\* \* \* \* \*